(12) United States Patent
Tran

(10) Patent No.: US 8,453,442 B1
(45) Date of Patent: Jun. 4, 2013

(54) UNDERWATER AIR POWER GENERATOR

(76) Inventor: Michael Dinh Tran, Manchester, NH (US)

( * ) Notice: Subject to any disclaimer, the term of this patent is extended or adjusted under 35 U.S.C. 154(b) by 307 days.

(21) Appl. No.: 12/788,856

(22) Filed: May 27, 2010

(51) Int. Cl.
*F03B 17/02* (2006.01)

(52) U.S. Cl.
USPC ............................................. 60/495; 60/496

(58) Field of Classification Search
USPC .................................. 60/495–496; 415/5, 92
See application file for complete search history.

(56) References Cited

U.S. PATENT DOCUMENTS

| | | | | |
|---|---|---|---|---|
| 2,513,136 A | * | 6/1950 | Borsos | 60/496 |
| 3,698,341 A | * | 10/1972 | Wagner | 114/40 |
| 3,934,964 A | * | 1/1976 | Diamond | 415/7 |
| 3,961,480 A | * | 6/1976 | West | 60/496 |
| 4,233,813 A | * | 11/1980 | Simmons | 60/496 |
| 4,326,132 A | * | 4/1982 | Bokel | 290/1 R |
| 4,718,232 A | * | 1/1988 | Willmouth | 60/495 |
| 6,990,809 B2 | * | 1/2006 | Abouraphael | 60/496 |
| 7,216,483 B2 | * | 5/2007 | Takeuchi | 60/495 |
| 8,171,729 B2 | * | 5/2012 | O'Briant | 60/495 |
| 2010/0223922 A1 | * | 9/2010 | McGahee | 60/495 |

* cited by examiner

*Primary Examiner* — Thomas Denion
*Assistant Examiner* — Brian Inacay
(74) *Attorney, Agent, or Firm* — Michael I. Kroll

(57) ABSTRACT

A power generator which generates power using the force of air rising in water. A plurality of containers are connected to a chain which in turn is connected to two gears. An air compressor produces air bubbles to be released into the containers which rotate to the surface of the water around the chain. The rotating containers cause the chain to rotate two gears which transforms rotational energy into electrical energy by a generator.

15 Claims, 8 Drawing Sheets

UNDERWATER AIR POWER GENERATOR

BACKGROUND OF THE INVENTION

1. Field of the Invention

The present invention relates to power generators and, more particularly, to a device for generating power using the force of air rising in water. The invention includes a plurality of containers connected to a chain. The chain is connected around two gears. An air producing apparatus produces bubbles that are trapped under the containers, thereby forcing the container towards the surface of the water. The containers cause the chain to rotate two gears. The rotational energy is transformed into electrical energy by a generator attached to at least one of the gears.

2. Description of the Prior Art

Numerous other types of generators, air producing apparatuses, and conveyors exist in the prior art. While these systems may be suitable for the purposes for which they were designed, they would not be as suitable for the purposes of the present invention, as hereinafter described.

SUMMARY OF THE PRESENT INVENTION

The present invention relates to power generators and, more particularly, to a device for generating power using the force of air rising in water. The invention includes a plurality of containers connected to a chain. The chain is connected around two gears. An air producing apparatus produces bubbles that are trapped under the containers, thereby forcing the container towards the surface of the water. The containers cause the chain to rotate two gears. The rotational energy is transformed into electrical energy by a generator attached to at least one of the gears.

A primary object of the present invention is to provide a power generator that overcomes the shortcomings of the prior art.

Another object of the present invention is to provide a power generator having a frame and barrier for preventing life form entry into the mechanism.

Yet another object of the present invention is to provide a power generator wherein said frame form structure for attaching components thereto.

Still yet another object of the present invention is to provide a power generator that harnesses the power of air rising in water.

A further object of the present invention is to provide a power generator including an underwater air compressor for producing air bubbles.

A yet further object of the present invention is to provide a power generator wherein said air compressor has an air line extending above the water line.

An additional object of the present invention is to provide a power generator wherein said air compressor has a remote control for engaging and disengaging said compressor Still yet another object of the present invention is to provide a power generator including underwater containers for trapping rising air.

Still a further object of the present invention is to provide a power generator including a chain connected to the underwater containers for rotating two gears.

Yet another object of the present invention is to provide a power generator whereby the rotational energy generated by the gears is converted to electricity by a generator attached to at least one of the gears.

Another object of the present invention is to provide a power generator that effectively and efficiently generates electricity.

Still yet another object of the present invention is to provide a power generator that is inexpensive to manufacture and use.

Additional objects of the present invention will appear as the description proceeds.

The present invention overcomes the shortcomings of the prior art by providing a power generator for harnessing the power of air rising in water in order to generate electricity. The underwater generator may be used in an ocean, lake, man-made reservoir, or any other deep body of water. Preferably, two devices drive the power generator: an aerating device, or "air web," and an air bubble capturing device, or "generator device." The air bubbles are produced directly under the container, thereby efficiently harnessing the power of air rising in water. A generator transforms the rotational energy of at least one of the gears into electrical energy.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
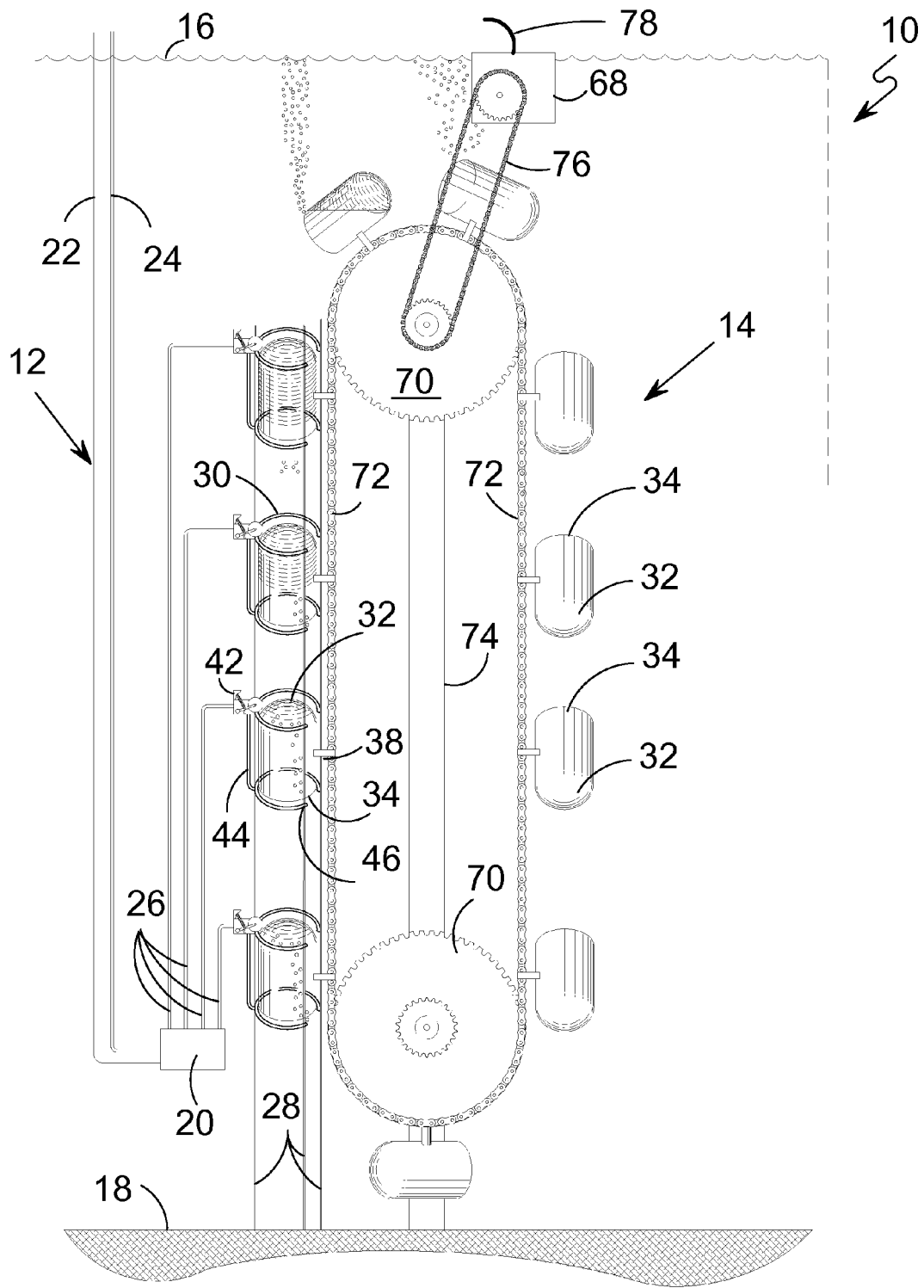
FIG. 1 is an illustrative view of the power generator of the present invention.

Turning now descriptively to the drawings, in which similar reference characters denote similar elements throughout the several views, the Figures illustrate the power generator of the present invention. With regard to the reference numerals used, the following numbering is used throughout the various drawing Figures.

10 power generator of the present invention
12 air web
14 generator device
16 water column
18 water column bed 20 air compressor
22 air compressor power
24 air compressor air supply
26 air pipe
28 frame
30 frame connector
32 air container
34 air container opening
36 sprocket gear
38 air container connecting structure
40 compressed air
42 air valve
44 air valve pipe
46 air valve pipe apertures
48 seat
50 trigger button arm
52 pivot pin
54 roller
56 spring rod
58 spring
60 spring rod pivot pin
62 spring supporter
64 trigger
66 pivot pin
68 generator
70 sprocket
72 sprocket chain
74 support
76 motor chain
78 power output
80 enclosure of 10
82. sprocket
84 generator gear

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an illustrative view of the power generator of the present invention. The present invention provides air web 12 powering generator device 14 within a column of water 16 to generate electrical output 78 to a remote location for storage or use. Air web 12 comprises compressor 20 having power 22 and air source 24 for generating compressed air that is fed through air pipes 26 to frame 32 supported air valves 42 that regulate the release of the compressed air into air valve pipe 44 and air valve pipe apertures 46, where then the air bubbles are captured within air containers 32. Air container 32 has air container connecting structure 38 attached to chain 72 mounted on frame support 74 sprockets 70. The air bubbles filling air containers 32 cause chain 72 to rotate about sprocket 70 which is connected to generator 68 by motor chain 76. As the air containers pass over sprocket 70 the air is released into the atmosphere and the empty air containers are returned to air web 12 in a continuous cycle.

Figure 2:
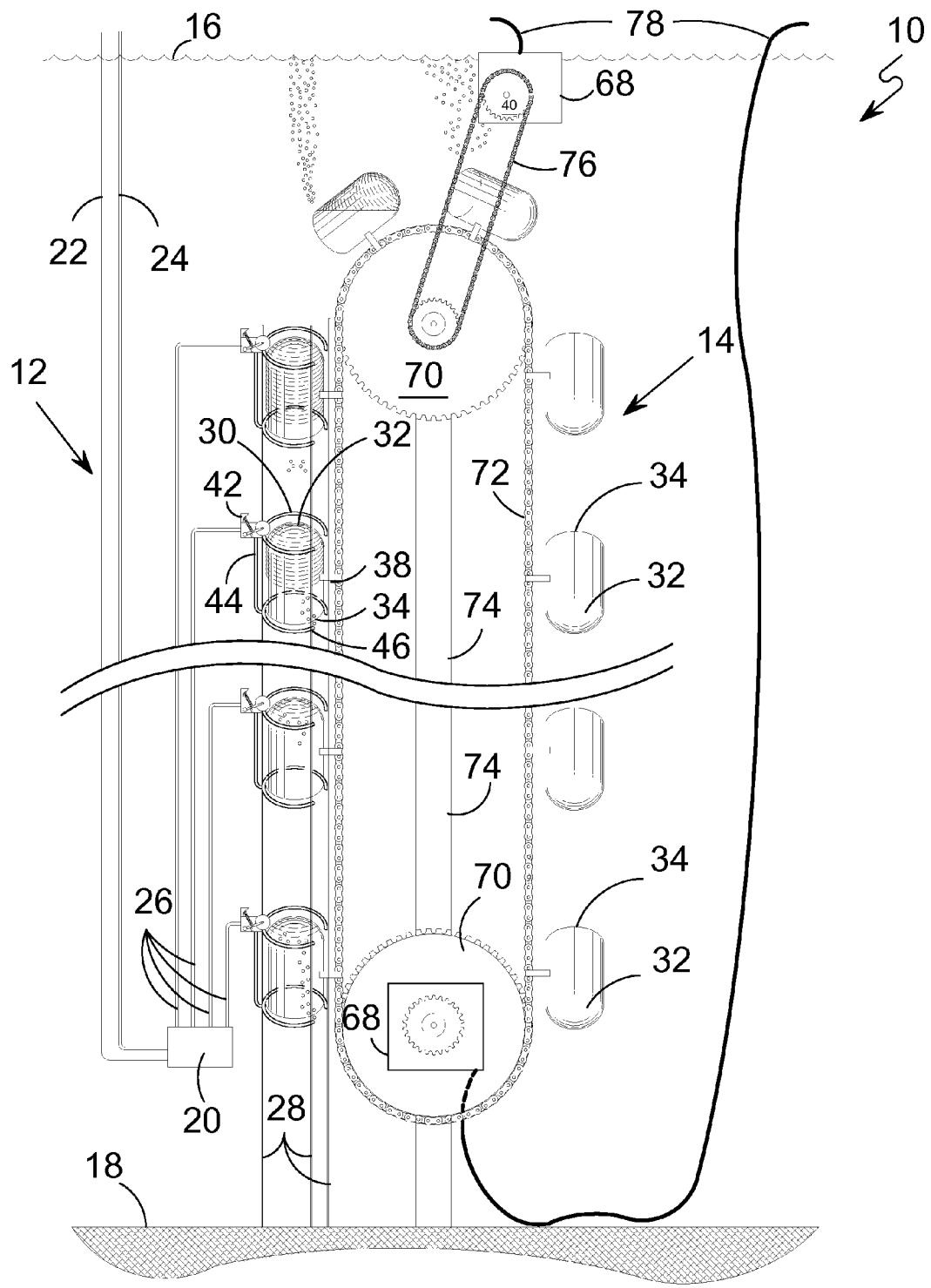
FIG. 2 is an illustrative view of the power generator of the present invention.

Referring to FIG. 2, shown is an illustrative view of the power generator of the present invention. The present invention provides a plurality of air pipes 26 connected to a respective plurality of air valves 42 supplying air to a plurality of air containers driving chain 72, sprocket 70 and motor chain 76 for generating power through generator 68.

Figure 3:
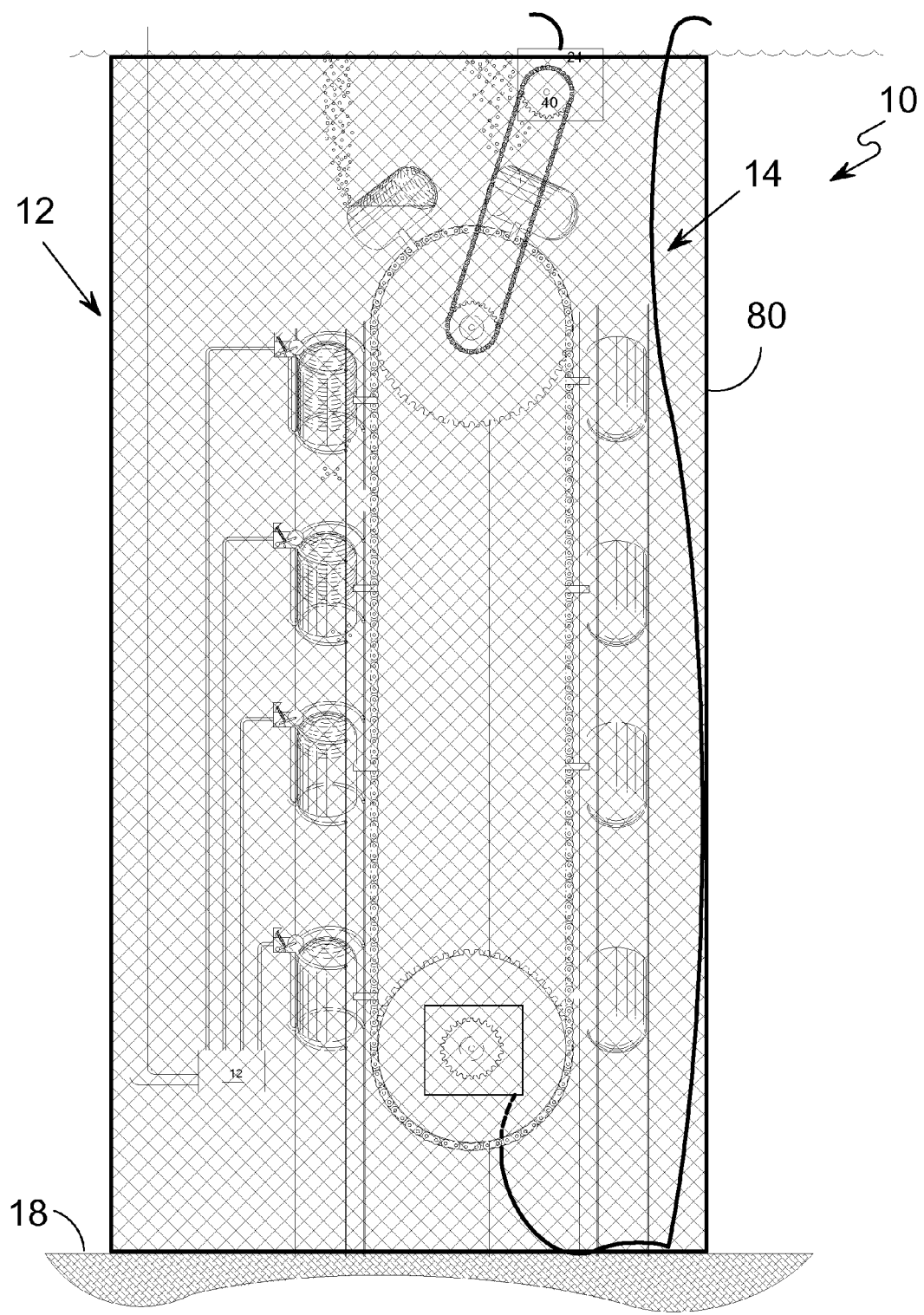
FIG. 3 is the power generator enclosed.

Referring to FIG. 3, shown is the power generator enclosed. The present invention provides that the power generator 10 comprising the air web 12 and generator device 14 can be contained within an enclosure 80 to prevent contamination of the device from debris or aquatic life.

Figure 4:
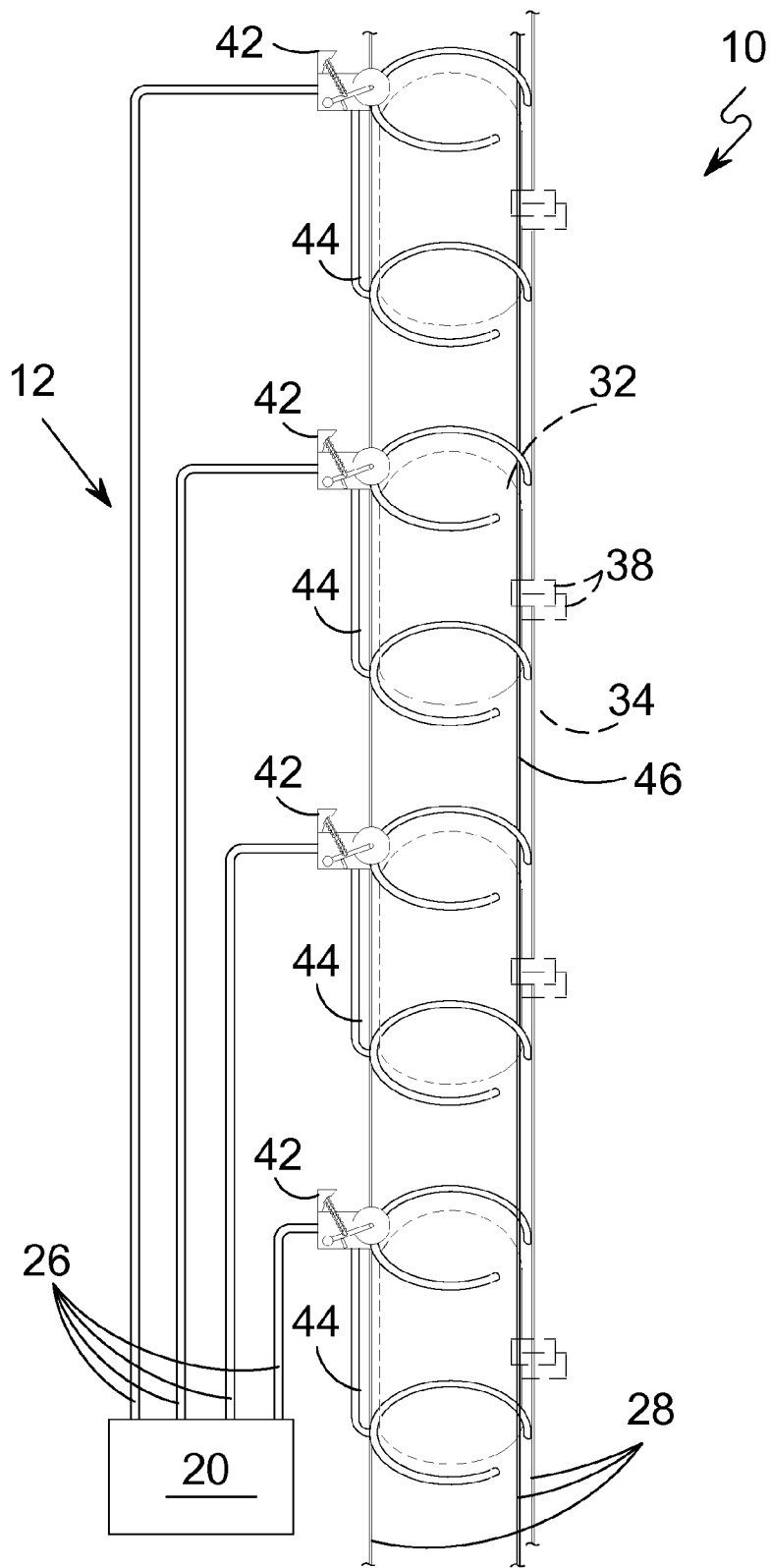
FIG. 4 is the air web of the present invention.

Referring to FIG. 4, shown is the air web of the present invention. Air web 12 comprises air compressor 20 generating compressed air that is channeled through air pipes 26 to support frame 28 air valves 42, which releases the air into air valve pipes 44 and air valve pipe apertures 46 where then the air bubbles rise into the air containers 32 thereby driving the generator device 14 to produce electricity.

Figure 5:
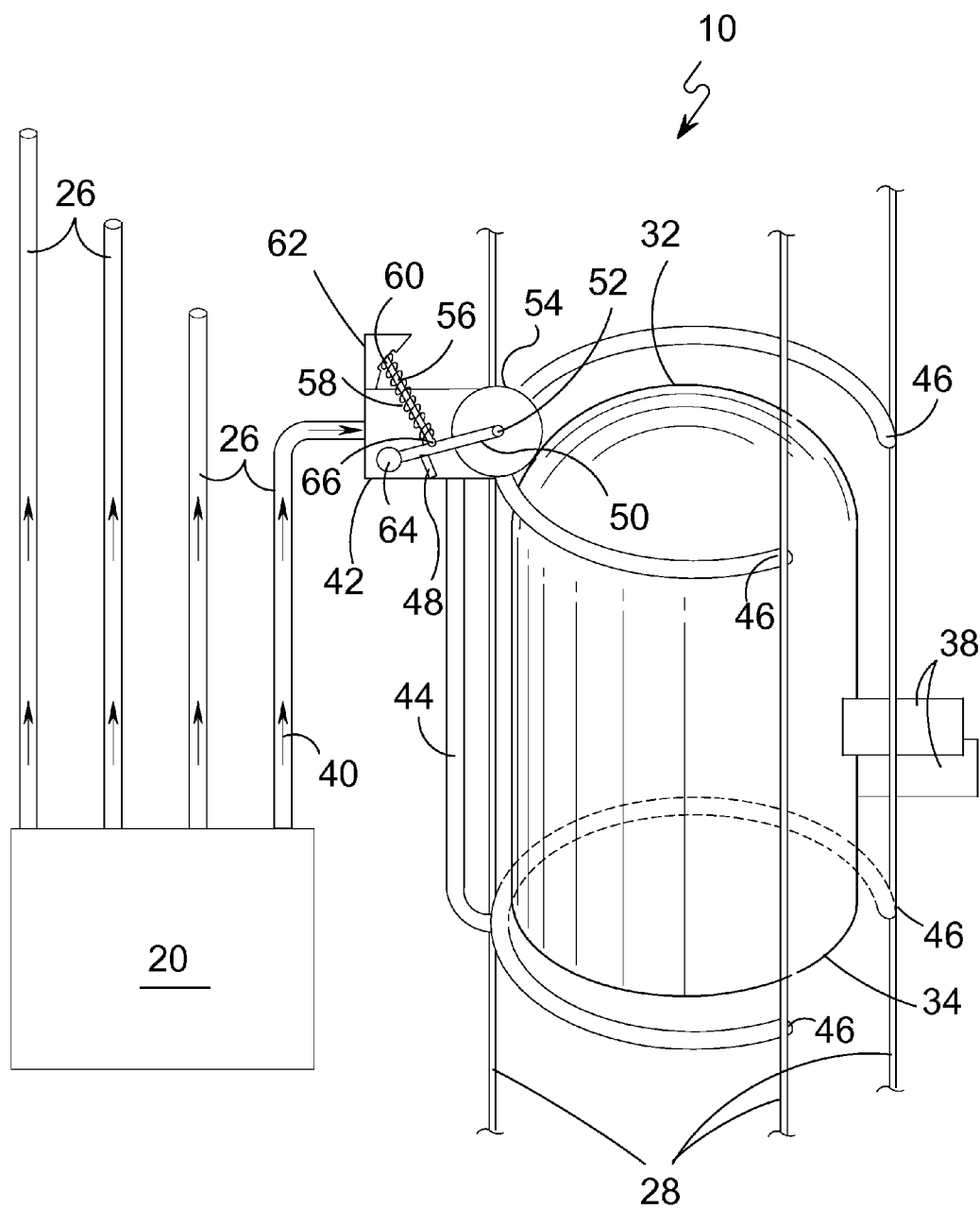
FIG. 5 is an enlarged view of the air valve closed.
Figure 6:
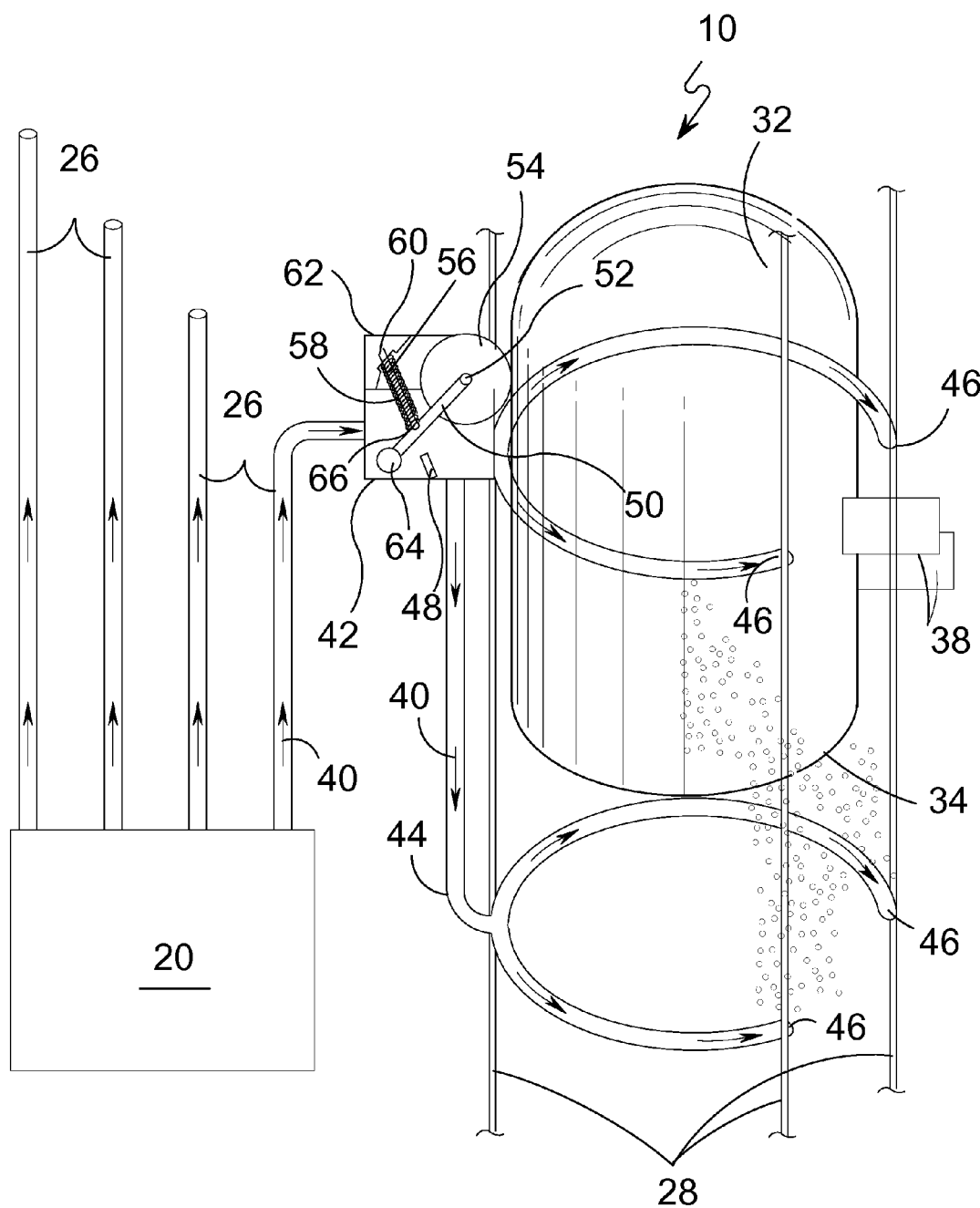
FIG. 6 is an enlarged view of the air valve open.

Referring to FIGS. 5 and 6, shown are enlarged views of an air valve.

As aforementioned compressor 20 generates compressed air 40 that is channeled by air pipes 26 to a respective air valve 42 that controls the release of the air into air valve pipe 44 and apertures 46. In the closed position as shown in FIG. 5, trigger button arm 50 having trigger 64 and roller 54 on respective ends is held to seat 48 by spring pressure generated upon trigger button arm by spring 58 mounted on spring rod 56 having pivot pins 60, 66. In FIG. 6, an air container 32 moves upward engaging roller 54 that pivots off of seat 48 compressing spring 58 and opening trigger 64 that releases compressed air through air valve pipe 44 and air valve pipe apertures 46, which will pass into air container 32. When the air container has moved past the pivoted roller 54, spring 58 moves trigger button arm 50 back to seat 48 shutting off the air.

Figure 7:
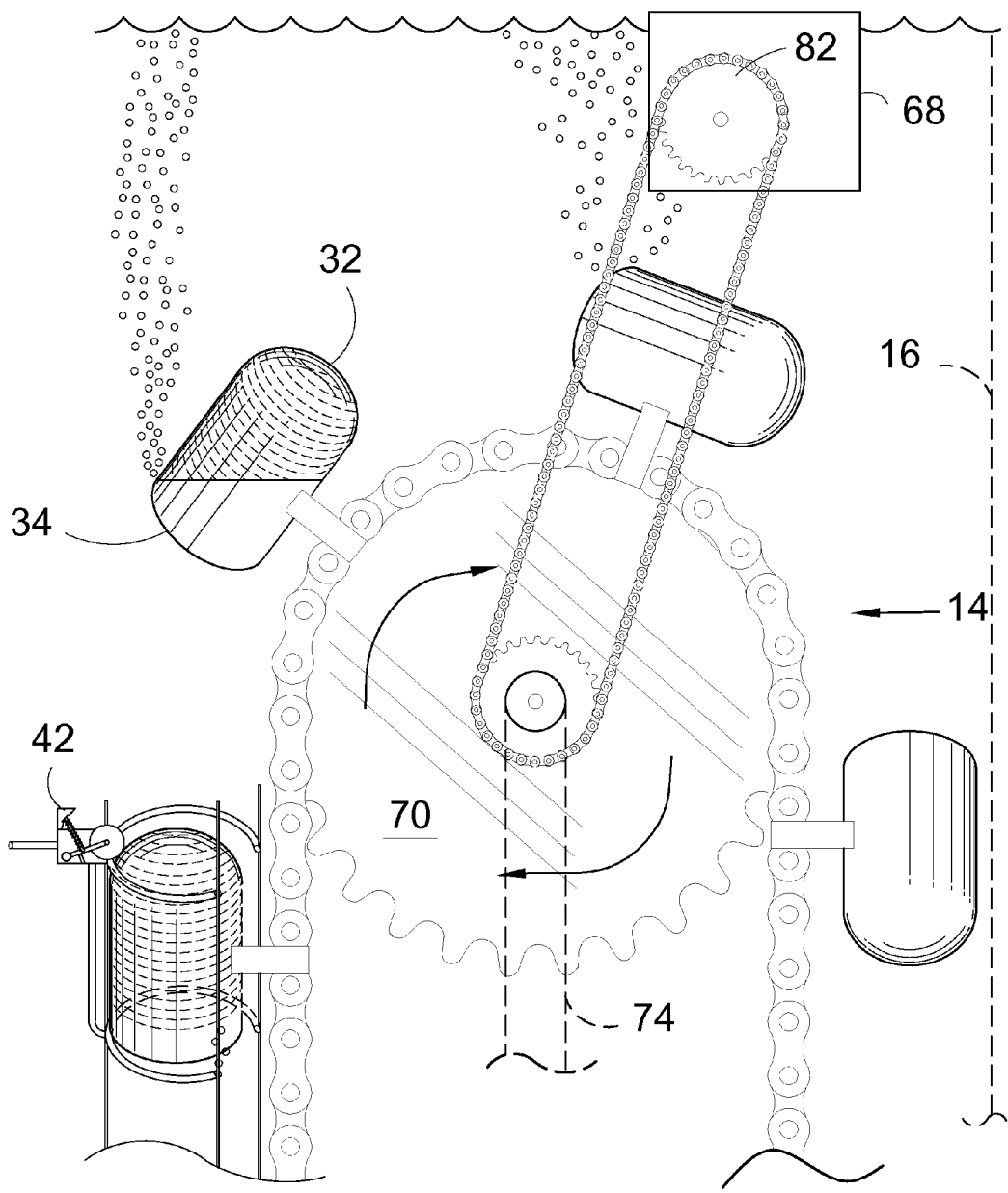
FIG. 7 is an enlarged top view of the power generator of the present invention.

Referring to FIG. 7, shown is an enlarged top view of the power generator of the present invention. The air bubbles within air containers 32 cause chain 72 to rotate about sprocket 70 which is connected to generator 68 by motor chain 76. As the air containers pass over sprocket 70 the air is released into the atmosphere and the empty air containers are returned to air web 12 in a continuous cycle.

Figure 8:
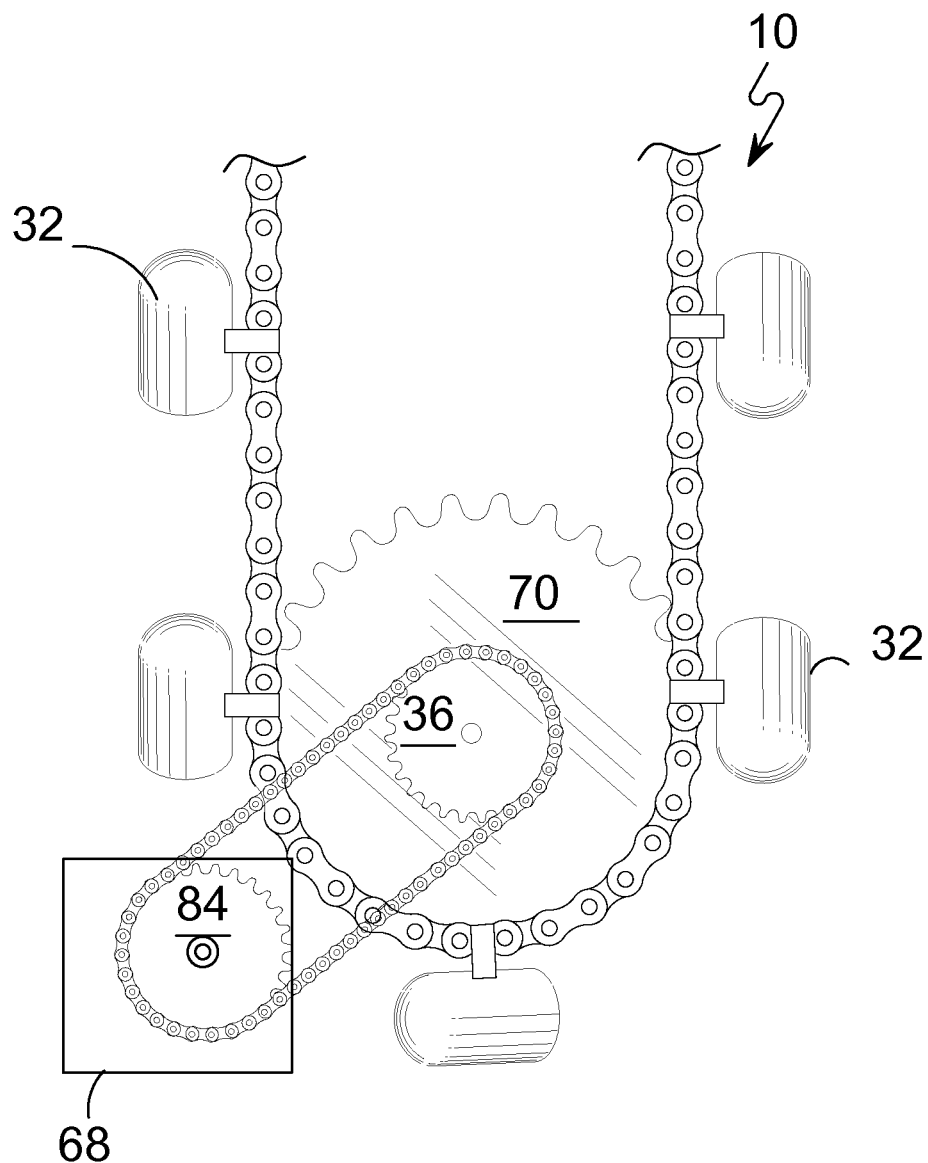
FIG. 8 is an enlarged alternate bottom view of the present invention.

Referring to FIG. 8, shown is an enlarged alternate bottom view of the present invention. The present invention provides that a second generator 68 can be attached to the bottom sprocket 70 having sprocket gear 36 and generator gear 84 with a motor chain extending therebetween.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An Underwater Power Generator comprising
   a) a plurality of containers each having an open end and a rounded closed end;
   b) a main chain on which said containers are mounted;
   c) upper and lower sprockets supporting a closed loop of a continuously moving said main chain;
   d) a first length of said chain between said sprockets moving upwardly;

e) a vertically extending frame structure adjacent said first length of said chain having spaced sets of upper and lower frame connectors through which said containers move upwardly;

f) an air valve assembly mounted on each of said upper frame connectors;

g) said lower frame connectors having apertures for delivering air into downwardly facing open ends of said containers as said containers move upwardly;

h) a compressor for delivering compressed air to each air valve assembly;

i) each air valve assembly having a roller actuated air valve for being opened when the rounded closed end of each container contacts and moves said roller for delivering air to said lower frame connectors and out of said apertures into said open ends of said containers as said containers move upwardly along with said length of chain, buoyancy of said air in said containers causing said chain to move continuously; and j) a first generator driven by one of said sprockets to produce electrical output.

2. An Underwater Power Generator according to claim 1, further comprising a barrier preventing life form entry into said underwater power generator.

3. An Underwater Power Generator according to claim 1, further comprising a frame forming structure for the purpose of attachment of components thereto.

4. An Underwater Power Generator according to claim 1, wherein each said roller is mounted for rotation adjacent one end of a trigger button arm, a trigger being attached to an opposite end of said arm, said trigger opening to release compressed air when said trigger arm is urged upwardly by said roller.

5. An Underwater Power Generator according to claim 4, having means for biasing said roller downwardly and said trigger button arm toward closing of said trigger.

6. An Underwater Power Generator according to claim 5, wherein each frame connector is C-shaped.

7. An Underwater Power Generator according to claim 6, in which a separate compressed air line extends from said air compressor to each said air valve assembly.

8. An Underwater Power Generator according to claim 7, wherein said lower frame connectors are adapted to produce bubbles for entry into open ends of said containers.

9. An Underwater Power Generator according to claim 8, wherein said bubbles become trapped under said containers.

10. An Underwater Power Generator according to claim 7, further comprising an air compressor remote control for the purpose of engaging and disengaging said air compressor.

11. An Underwater Power Generator according to claim 7, wherein said air compressor further comprises an air line extending above a water line.

12. An Underwater Power Generator according to claim 8, further comprising a second generator driven by another one of said sprockets.

13. An Underwater Power Generator according to claim 12, wherein said air lines are supported by said support structure.

14. An Underwater Power Generator according to claim 13, wherein said second generator is connected to said another one of said sprockets through a drive chain attached to a gear mounted on said another of said sprockets.

15. A method of Underwater Power Generation comprising the steps of:

a) providing a plurality of containers each having an open end and a rounded closed end;

b) mounting said containers on a main chain;

c) providing upper and lower sprockets supporting a closed loop for continuously moving said main chain in which a first length of said chain between said sprockets is moving upwardly;

d) providing a vertically extending frame adjacent said first length of said chain having spaced sets of upper and lower frame connectors through which said containers move upwardly;

e) mounting an air valve assembly on each of said upper frame connectors;

f) said lower frame connectors having apertures for delivering air into downwardly facing open ends of said containers as said containers move upwardly;

g) providing a compressor to deliver compressed air to each air valve assembly;

h) each air valve assembly having a roller actuated air valve being opened when the rounded closed end of each container contacts and moves said roller for delivering air to said lower frame connectors and out of said apertures into said open ends of said containers as said containers move upwardly along with said length of chain, buoyancy of said air in said containers causing said chain to move continuously; and i) providing a first generator driven by one of said sprockets to produce electrical output.

* * * * *